3,632,536
BLOCK COPOLYMERS PREPARED BY REACTING PREPOLYMERS CONTAINING TERMINAL ISOCYANATE GROUPS WITH AROMATIC OLIGAMIDES
Yoshio Iwakura and Keikichi Uno, Tokyo, Shigeru Kajiyama, Osaka-fu, Yoshihiro Kituda, Higashi-Osaka, Takao Kusushita, Tokyo, and Kunio Iijima, Hirakata, Japan, assignors to Matsushita Electric Works, Ltd.
No Drawing. Filed Aug. 8, 1968, Ser. No. 751,063
Claims priority, application Japan, Aug. 24, 1967, 42/54,446
Int. Cl. C08g 20/00, 22/00, 51/48
U.S. Cl. 260—18 TN         12 Claims

ABSTRACT OF THE DISCLOSURE

Block polymer of (1) a prepolymer having terminal isocyanate groups obtained by reacting a difunctional compound having active hydrogen atoms and an average molecular weight of 500–20,000 with a diisocyanate compound and (2) an aromatic oligoamide having termina amino groups, an average molecular weight of 300–5000 and a melting point not lower than 100° C., has high elastic performance over a wide range of temperature, such performance being stable against temperature variation, and is useful in making fibers, films, etc., as coating material, adhesive material, etc., and as blend with other elastomer, etc. to improve properties of the latter. The block polymer is produced by reacting a difunctional compound having active hydrogen atoms and an average molecular weight of 500–20,000 with an excess of a diisocyanate compound to prepare a prepolymer having terminal isocyanate groups, and reacting the formed prepolymer with an aromatic oligoamide having terminal amino groups, an average molecular weight of 300–5000 and a melting point not lower than 100° C.

---

This invention relates to novel elastomeric block copolymers and to the production thereof. More particularly this invention relates to elastomeric block copolymers of a prepolymer having terminal isocyanate groups and an aromatic oligoamide having terminal amino groups, and also to the production thereof.

It is known to produce the so-called polyurethane elastomer by preparing a prepolymer having terminal isocyanate groups and then subjecting the prepolymer to chain extending reaction with a diamine which is non-aromatic and/or low molecular weight liquid. However, these conventional polyurethane elastomers have some drawbacks. Thus, for example, they are not fully satisfactory in thermal stability (the elastic performance is considerably affected by temperature variation).

Therefore, it is an object of this invention to provide a novel and improved urethane block copolymer which has a high elastic performance.

It is another object of this invention to provide a novel and improved urethane block copolymer which shows a high elastic performance over a wide range of temperature.

It is still another object of this invention to provide a novel and improved urethane block copolymer, the excellent elastic performance of which is stable against temperature variation.

Other objects, features and advantages of the invention will be apparent from the following description.

Briefly, the novel block copolymer of this invention is a block copolymer of (1) a prepolymer having terminal isocyanate groups obtained by reacting a difunctional compound having active hydrogen atoms and an average molecular weight of 500–20,000 with a diisocyanate compound and (2) an aromatic oligoamide having terminal amino groups, an average molecular weight of 300–5000 and a melting point not lower than 100° C.

According to this invention these novel block copolymers are produced by reacting a difunctional compound having active hydrogen atoms and an average molecular weight of 500–20,000 with a diisocyanate compound to prepare a prepolymer having terminal isocyanate groups, and reacting the formed prepolymer with an aromatic oligoamide having terminal amino groups, an average molecular weight of 300–5000 and a melting point not lower than 100° C.

The present invention will be explained in more detail as follows.

The method of this invention comprises two steps, i.e. the first step for preparing a prepolymer having terminal isocyanate groups and the second step for block copolymerizing the prepolymer with an aromatic oligoamide having terminal amino groups.

The first step is well known per se in the art of the production linear polyurethane elastomers.

The difunctional compounds to be used in the first step of the method of this invention are those having active hydrogen atoms and having an average molecular weight of 500–20,000 and preferably a glass transition temperature not higher than 10° C. More preferably, the difunctional compounds have an average molecular weight of 1000–10,000 and a glass transition temperature not higher than −30° C.

Examples of these difunctional compounds are aliphatic polyether diols, aliphatic polyester diols, dihydroxy polyhydrocarbons, etc. More particular and preferable examples of these diols are polyoxytetramethylene glycols, poly-ε-caprolactone diols, polyoxypropylene glycols, polybutadiene diols, polybutylene glycols, polyamylene glycols, etc. Other diols such as polyalkylene ether thioether glycols, alkylenearyl ether glycols, etc. conventionally used in the art of linear polyurethane elastomers may also be employed in this invention. A mixture of these compounds may also be used.

Diisocyanate compounds also well known in the art of the production of linear polyurethane elastomers may be used in carrying out the method of this invention. Examples of these diisocyanates are 2,4-tolylene diisocyanate, 2,6-tolylene diisocyanate, hexamethylene diisocyanate, halogen-substituted or non-substituted diphenylmethane diisocyanate, xylylene diisocyanate, p-phenylene diisocyanate, m-phenylene diisocyanate, 4,4′-biphenylene diisocyanate, methylene-bis-(4-phenyl diisocyanate), octamethylene diisocyanate, ω,ω′-dipropyl diisocyanate, cyclohexan1,3 - diisocyanate, cyclohexane-1,4-diisocyanate, 2,2′,6,6′ - tetraethylene - 4,4′ - diphenylmethane diisocyanate, dibenzyl diisocyanate, diphenylsulfon-4,4′-diisocyanate, 3,3′-dimethyl-4,4′-diphenyl diisocyanate, etc. Other diisocyanate compounds known in the art of the production of polyurethane elastomers may also be used in this invention.

The difunctional compound is reacted with an excess of the organic diisocyanate compound. Preferably about 2 equivalents of the diisocyanate are employed with respect to the difunctional compound.

The reaction may be conducted in the presence or absence of a catalyst and in the presence or absence of a solvent. Examples of the catalyst when used are amines such as triethylamine, and organo-metallic compounds such as cobalt naphthenate, tin chloride, tetra-n-butyl tin, etc. Examples of the solvent when used are tetrahydrofuran, N,N-dimethylformamide, N,N-dimethylacetamide, dimethylsulfoxide, toluene, anisol, etc. These and other catalysts and solvents are also well known in the art of the production of linear polyurethane elastomers.

Preferably the reaction is conducted in the absence of moisture. Thus, it is preferable to carry out the reaction in a dry air or in a dry inert atmosphere such as dried nitrogen gas. The reaction temperature is generally 50–150° C., preferably 90–130° C. and the reaction time is generally 20 minutes to 3 hours, preferably 30–90 minutes.

The prepolymer having terminal isocyanate groups is then copolymerized with an aromatic oligoamide having terminal amino groups. This is the second step of the process of this invention.

The aromatic oligoamides to be used in the second step are those having terminal amino groups, an average molecular weight of 300–5000, preferably 346–1200, and a melting point not less than 100° C., preferably not less than 150° C. If the molecular weight and/or melting point of the oligoamides to be employed are out of the range specified above the resulting block-copolymer elastomers would have no desirable elasticity and/or thermal stability.

The wholly aromatic oligoamide (wholly aromatic diamines of a high molecular weight) having terminal amino groups to be used in this invention may be represented by the following general formula:

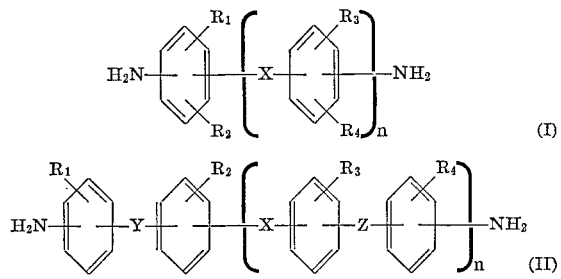

wherein each of $R_1$, $R_2$, $R_3$ and $R_4$ is hydrogen, halogen or an alkyl group having 1–4 carbon atoms, X is —NRCO— or —CONR—, wherein NR is hydrogen, halogen or an alkyl group having 1–4 carbon atoms, and each of Y and Z is a single bond connecting the adjacent phenylene groups or a divalent group selected from the class consisting of —O—, —SO$_2$—, —CO— and

wherein each of R' and R" is hydrogen, halogen or an alkyl group having 1–4 carbon atoms, and $n$ is a number of at least one.

Among these compounds, those represented by the Formula I are preferable. Among the preferred compounds of the Formula I are for example the following compounds:

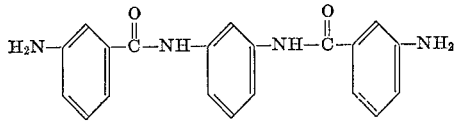

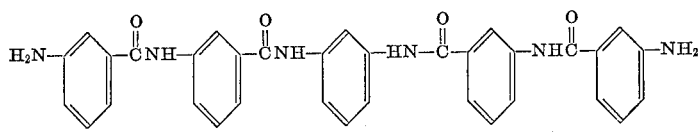

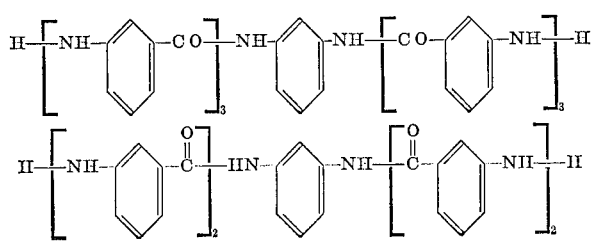

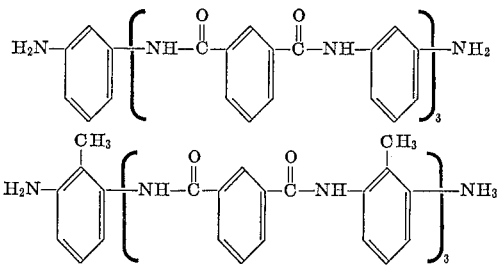

These oligoamides may be prepared in various manner known per se. However, it is preferable to prepare them by reacting an aromatic diamine with at least one aromatic dibasic acid halide, the former being used in a molar excess to the latter. In this case a mixture of amides is formed and such mixture may be used in carrying out the invention without separating one and particular amide.

A mixture of two or more of these amides may also be used, if desired.

For the copolymerization the amide is used in an amount of 85–110%, preferably about 100% of the theoretical amount in respect of free isocyanate groups present in the prepolymer. Thus, it is recommended to conduct a quantitative analysis for free isocyanate groups present in the prepolymer, in order to determine the proper amount of the oligoamide.

The block copolymerization may be conducted in the presence or absence of an organic solvent and in the presence or absence of a catalyst.

Examples of the solvents which may be used are N,N-dimethylformamide, N,N-dimethylacetamide, dimethylsulfoxide, hexamethylenesulfonamide, etc. which can dissolve the resulting block copolymer.

Among catalysts which may be used in the copolymerization are, for example, stannous chloride, stannic chloride, di-n-butyl tin dilaurate, ferrous acetyl acetonate, lead oleate, etc.

Generally, this copolymerization may be conducted at a temperature of from 0° C. to 120° C., preferably 20–70° C. The reaction is continued until the copolymerization proceeds to a desired extent. Generally, a reaction time of 30 minutes to 24 hours is employed.

The formed block copolymer may be recovered in any suitable manner. Thus, for example, the polymer solution is poured into a non-solvent for the polymer. Examples of such non-solvent are water, alcohols, ketones, etc., but water is preferable.

The novel elastomeric block copolymers of this invention have a glass transition temperature not higher than 20° C., preferably not higher than —25° C.

Since the novel block copolymers contain rigid segments of aromatic oligoamides of high molecular weight, they have various excellent properties not seen in conventional polyurethane elastomers and natural or synthetic rubbers. Thus the elastomers of this invention are stable against temperature variation and retain excellent elastic properties even at a high temperature. They have a high elongation even with a high strength, in contrast to conventional rubbers which are low in strength when the elongation is high.

The block-copolymers of this invention may be formed, in a conventional manner, into various shaped articles such as fibers, films, etc. and are also useful as coating material, adhesive material, etc. The block copolymer of this invention may be blended with another elastomer or plastic material to improve the properties of the latter.

The following examples illustrate the invention.

EXAMPLE 1

A four-necked flask fitted with a stirrer and nitrogen inlet was charged with 43.5 g. of freshly distilled 2,4-tolylenediisocyanate, and there were added dropwise for 15 minutes 2.5 g. of polyoxytetramethyleneglycol (molecular weight 2010, glass transition temperature −45° C.) in nitrogen atmosphere. Then the mixture was stirred on an oil bath at 120±5° C. for 90 minutes. The resulting prepolymer contained 3.58% of free NCO groups. 74.3 g. of this prepolymer were placed in a dried flask, and a solution of 10.8 g. of N,N′-metaphenylene-bis-meta aminobenzamide (molecular weight 346, melting point 214° C.) dissolved in 50 ml. of dry dimethylformamide was poured thereinto. The mixture was stirred at the room temperature for 2 hours to obtain a viscous solution. The viscous solution was poured into water and the precipitate formed was separated, washed twice respectively with methanol and acetone, and dried at 70° C. under reduced pressure.

The block copolymer thus obtained was dissolved in dimethylformamide and the solution was spread on a glass plate. Upon removal of the solvent by evaporation there was obtained a tough, colorless, transparent, elastic film having the following properties:

$\mu_{inch}$=0.64, softening point: 205–230° C.
Initial modulus: 30 kg./cm.²
Strain recovery:
  78% (at 25° C.)
  70% (at 70° C.)
Tensile stress at 200% elongation:
  30 kg./cm.² (25° C.)
  24 kg./cm.² (70° C.)
Ultimate elongation: 1,100%
Ultimate strength: 378 kg./cm.²

EXAMPLE 2

In the same four-necked flask as used in Example 1 there were placed 38.8 g. of freshly distilled 2,4-tolylenediisocyanate, and there were added dropwise for 15 minutes 232 g. of polyoxytetramethylene glycol (molecular weight 2078, glass transition temperature −45° C.) in a nitrogen atmosphere. After the addition, the mixture was heated while stirring on an oil bath at 100±5° C. for 90 minutes. The resulting prepolymer contained 3.5% of free NCO groups. 41.9 g. of this prepolymer were placed in a dried flask, and a solution of 10.5 g. of N,N′-metaphenylene - bis[N,N′ - metaphenyleneamide(metabenzamide)] (molecular weight 594, melting point 284–285° C.) of the formula

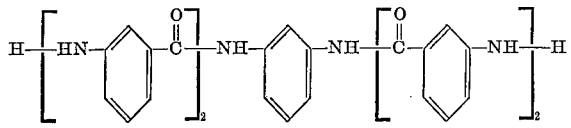

dissolved in 50 ml. of dry dimethylformamide was poured thereinto. The mixture was stirred at the room temperature for 2 hours to obtain a viscous solution. This solution was processed in the same manner as in Example 1 and there were obtained 41.5 g. of the block-copolymer.

A tough, brown, elastic film prepared from this block copolymer in the same manner as in Example 1 had the following properties:

$\mu_{inch}$=0.33, softening point: 230–260° C.
Initial modulus: 71 kg./cm.²
Stain recovery:
  87% (at 25° C.)
  84% (at 70° C.)
Tensile stress at 200% elongation:
  145 kg./cm.² (25° C.)
  137 kg./cm.² (70° C.)
Ultimate elongation: 368%
Ultimate strength: 417 kg./cm.²

EXAMPLE 3

To 66 g. of freshly distilled 1,5-naphthalene diisocyanate in a four-necked flask same as in Example 1 were added dropwise for 15 minutes and in nitrogen atmosphere 324 g. of poly-ε-caprolactonediol (molecular weight 2078). The mixture was then stirred for 90 minutes on an oil bath at 100±5° C., to form a prepolymer. After cooling, 90 g. of an oligoamide (molecular weight 594, melting point 284–285° C.) of the formula:

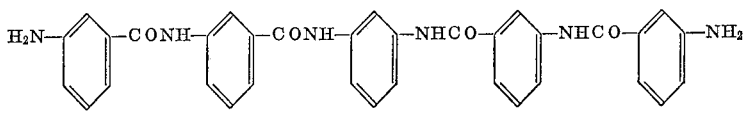

dissolved in 850° cc. of dimethylacetamide were added to the prepolymer, and the mixture was stirred for 12 hours at 60° C. to obtain a viscous solution of a block copolymer.

A tough, yellow, opaque, elastic film prepared from this block copolymer in the same manner as in Example 1 had the following properties:

$\mu_{inch}$=0.36, softening point: 240–280° C.
Initial modulus: 340 kg./cm.²
Strain recovery: 47.8% (25° C.)
Tensile stress at 200% elongation:
  53 kg./cm.² (25° C.)

EXAMPLE 4

To 110.3 g. of freshly distilled p,p′-diphenyl methane diisocyanate were added dropwise for 15 minutes in nitrogen atmosphere 443.4 g. of polyoxypropyleneglycol (molecular weight 2010, glass transition temperature −70° C.). After the addition the mixture was stirred for 60 minutes on an oil bath at 120±5° C., to form a prepolymer containing 3.31% of free isocyanate groups. To 39 g. of this prepolymer in a dried flask was poured a solution of 9 g. of the amide same as in Example 3 dissolved in 50 ml. of dry dimethyl-formamide, and the mixture was stirred at the room temperature for 2 hours to obtain a viscous solution of block copolymer.

A brown, transparent, tough, elastic film obtained from this block copolymer in the same manner as in Example 1 had the following properties:

$\mu_{inch}$=0.69, softening point: 260–280° C.
Initial modulus: 42 kg./cm.²
Strain recovery:
  94.6 kg./cm.² (at 25° C.)
  92.5 kg./cm.² (at 70° C.)
Tensile stress at 200% elongation:
  30 kg./cm.² (25° C.)
  29 kg./cm.² (70° C.)

EXAMPLE 5

To 5.23 g. of p,p'-diphenylmethane diisocyanate in a four-necked flask were added dropwise 10.4 g. of polyoxypropyleneglycol (molecular weight 1000, glass transition temperature −70° C.). After the addition, the mixture was stirred for 90 minutes on an oil bath at 120±5° C. to form a prepolymer containing 5.8% of free NCO groups. To 8.94 g. of this prepolymer in a dried flask was poured a solution of an oligoamide (molecular weight 822, melting point 308–310° C.) of the following formula:

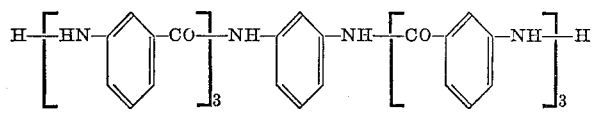

dissolved in 25 ml. of dry dimethylformamide, and the mixture was stirred for 2 hours at the room temperature to obtain a viscous solution of a block copolymer.

The solution was processed and formed into a film in the same manner as in Example 1. The film was tough, opaque and elastic.

EXAMPLE 6

A 20% solution of the block copolymer of Example 3 dissolved in dimethylformamide was extruded through 6 spinning orifices (each being 0.12 mm. in diameter) into an aqueous coagulating bath of a length of 3 m., and the formed filaments were taken-up at a rate of 10 m./min. The white elastic filaments thus obtained could be stretched 3 times the length.

EXAMPLE 7

In a 25% solution of the block copolymer of Example 3 dissolved in dimethylformamide, there was dipped a filter paper sheet (α-cellulose content 99%) for 1 minute at the room temperature. The impregnated paper sheet was vertically suspended and dried for 1 hour in air and further dried at 120° C. in vacuo. There was obtained resin impregnated filter paper sheet with a resin content of 41%. The resulting sheet was soft and leather-like and was improved in the strength, elongation and resistance to water. The properties were as follows:

|  | Before test | After test |
|---|---|---|
| Ultimate elongation (percent) | 3.0 | 6.9 |
| Ultimate strength (kg./mm.²) | 1.48 | 2.7 |

EXAMPLE 8

A cellulosic paper sheet (4 mils in thickness, α-cellulose content 99%) was impregnated with a solution of the block copolymer of Example 1 and dried. Ten of the dried sheet (resin content 60%) were stacked. The stack was clamped between smooth stainless steel plates and heated in a press at 170° C. under 30 kg./cm.² for 4 minutes. There was obtained an elastic laminate sheet.

EXAMPLE 9

The block copolymer of Example 3 was dissolved in dimethylformamide and the solution was coated on a wooden sheet and dried. The dried coating contained the polymer in an amount of 4–5 g./m.². The coating was lustrous, wear-resistant and had a soft hand and feel.

EXAMPLE 10

The film obtained in Example 5 was washed with an alkaline aqueous solution containing NaOH and NaCN for 10 seconds and further with water for 30 seconds. Then the film was treated for 3 minutes at the room temperature with a sensitizing solution of $SnCl_2$ 10 g. and HCl 40 g. dissolved in 1000 cc. water, washed with water, further treated for 5 minutes at the room temperature with an activator solution of $PbCl_2$ 1 g. and HCl 10 cc. dissolved in 4000 cc. water, and washed with water. Then, the film was chemically copper plated in the usual manner for 15 minutes. Thus, there was deposited a copper layer (about 0.3μ in thickness) firmly adhered to the surface of the film.

EXAMPLE 11

A mixture of 20 parts by weight of the block copolymer of Example 2 and 100 parts by weight of polyvinylchloride (molecular weight 1000) was homogeneously blended on a roll mill (heated to 170° C.) for 5 minutes and formed into an opaque sheet. This sheet was press-heated at 170° C. for 30 seconds to obtain a transparent sheet which is far more excellent in impact strength than the sheet consisting only of the same polyvinylchloride. When the sheet was 3 times at 40–50° C. there was obtained an opaque tough sheet.

EXAMPLE 12

A solution of 20 parts by weight of the block copolymer of Example 2 dissolved in dimethyl-formamide and a solution of 100 parts by weight of polyvinylchloride (molecular weight 1000) dissolved in tetrahydrofuran were mixed together and the homogeneous mixture was poured into water to coprecipitate the polymers. The precipitate was separated, washed and dried. The polymer blend thus obtained was processed in the same manner as in Example 11 to form a sheet with an improved impact strength.

EXAMPLE 13

While stirring a mixture of 32 g. m-phenylenediamine, 7.5 g. borax, 10 g. sodium sulfite and 1600 g. water, there was added a solution of 15 g. isophthaloyl chloride and 5 g. terephthaloyl chloride in 1000 g. xylene. The mixture was further stirred for 2 minutes and the precipitate formed was separated, washed twice with water and once with acetone, and then dried at 150° C. for 1 hour, to obtain 24 g. of gray powder. The product contained about 1.33 mols of the diamine unit per mole of total of isophthalate and isophthalate units, and had an average molecular weight of 822 and a melting point higher than 300° C. The average structural formula of this product was as follows:

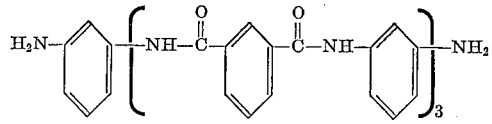

EXAMPLE 14

A mixture of 38.8 g. of freshly distilled 2,4-tolylene-diisocyanate and 232 g. of polyoxytetramethyleneglycol (molecular weight 2078) was stirred at 100° C. for 90 minutes in nitrogen atmosphere. The resulting prepolymer contained 3.5% of NCO groups. The prepolymer 41.9 g. was charged in a dried flask, and 14.4 g. of the product of Example 13 dissolved in 100 g. of dry dimethylacet-amide were added thereto. The mixture was stirred at the room temperature for 2 hours to obtain a solution containing 49.0 g. of block copolymer.

The polymer solution was processed and formed into a film in the same manner as in Example 1. The yellow transparent film thus obtained had the following properties:

|  | 25°C. | 75°C. |
|---|---|---|
| 200% modulus, kg./cm.² | 85 | 80 |
| Recovery, percent | 80 | 80 |

EXAMPLE 15

While stirring a mixture of 4.88 g. 2,6-tolylenediamine, 4.04 g. terephthaloyl chloride and 14.5 g. of dimethylformamide, there was added a solution of 4.12 g. of isophthaloyl chloride dissolved in 5 g. of dry xylene. The temperature of the mixture rapidly raised to 47° C. There was obtained a solution of oligoamide having the following average structural formula:

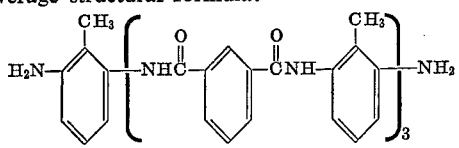

To this solution were added 54.8 g. of the prepolymer prepared in Example 14 to obtain a polymer solution, from which was formed a transparent yellow elastic film.

As explained hereinbefore, the elastomers of this invention have stable elastic properties against temperature variation. This is demonstrated by the following table:

MODULUS

| Ex. | −50° C. | −30° C. | −10° C. | 10° C. | 50° C. | 70° C. | 90° C. | 110° C. |
|---|---|---|---|---|---|---|---|---|
| 1 | $3 \times 10$ | $8 \times 10^9$ | $2 \times 10^8$ | $2 \times 10^8$ | $7 \times 10^7$ | $6 \times 10^7$ | $5 \times 10^7$ | $5 \times 10^7$ |
| 2 | $1 \times 10^9$ | $8 \times 10^8$ | $5 \times 10^8$ | $4 \times 10^8$ | $3.2 \times 10^8$ | $3 \times 10$ | $3 \times 10^8$ | $2.6 \times 10^8$ |
| 3 | | | | $1 \times 10^9$ | $9 \times 10^8$ | $8 \times 10^5$ | $7 \times 10^8$ | $7 \times 10^8$ |
| A | $2.2 \times 10^{10}$ | $8 \times 10^9$ | $8 \times 10^8$ | $5 \times 10^8$ | $1.0 \times 10^8$ | $6 \times 10^7$ | $5 \times 10^7$ | $4 \times 10^7$ |
| B | $5 \times 10^9$ | $1 \times 10^9$ | $4.5 \times 10^8$ | $3.2 \times 10^8$ | $2.2 \times 10^8$ | $2.2 \times 10^8$ | $6 \times 10^7$ | $8.2 \times 10^7$ |

Remarks:
A = Same as Example 2 except that the following diamine was used in place of the oligoamide.

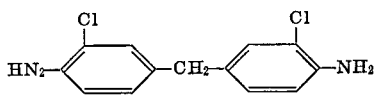

B = Same as Example 2 except that hydrazine was used in place of the oligoamide.

What we claim is:

1. A method of producing block copolymers which comprises reacting in the presence of a solvent a difunctional compound having active hydrogen atoms and an average molecular weight of 500–20,000 with an excess of an organic diisocyanate compound to prepare a prepolymer having terminal isocyanate groups, and reacting the formed prepolymer with an aromatic oligoamide having an average molecular weight of 300–5000 and a melting point not lower than 100° C., said oligoamide being selected from the group consisting of the compounds of the formulae:

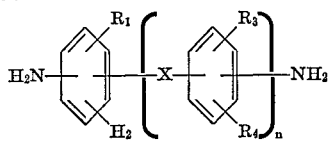

and

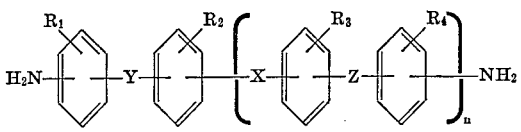

wherein each of $R_1$, $R_2$, $R_3$ and $R_4$ is a member selected from the group consisting of hydrogen, halogen atoms and alkyl groups having 1–4 carbon atoms, X is —NRCO— or —CONR— wherein NR is a member selected from the group consisting of hydrogen, halogen atoms and alkyl groups having 1–4 carbon atoms, each of Y and Z is a single bond connecting the adjacent phenylene groups or a divalent group selected from the class consisting of —O—, —SO$_2$—, —CO— and

wherein each of R' and R" is a member selected from the class consisting of hydrogen, halogen atoms, or alkyl groups having 1–4 carbon atoms, and $n$ is a number of at least one, and thereafter precipitating the block polymer with water, washing and recovering the thus precipitated polymer.

2. A method as claimed in claim 1 wherein the oligoamide is selected from the group consisting of the compounds of the following formulae:

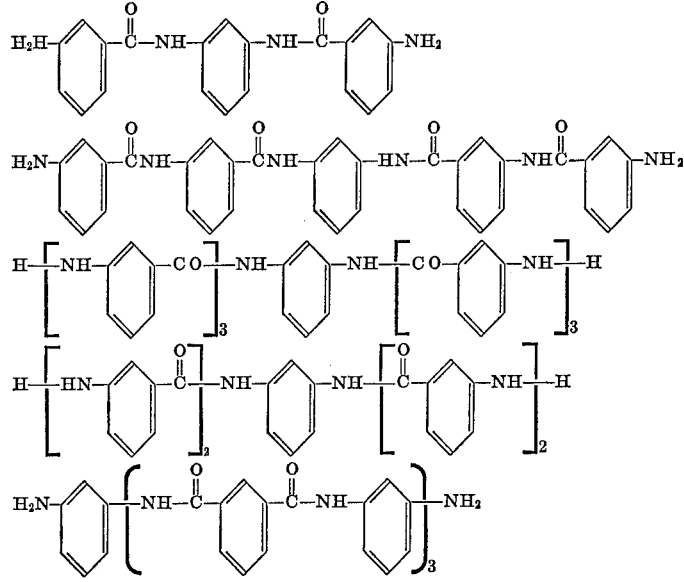

and

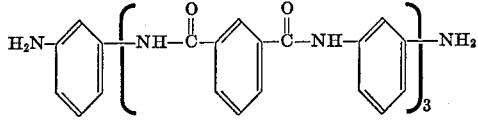

3. A method as claimed in claim 1 wherein the amide is used in an amount of 85–110% of the theoretical amount in respect of the free isocyanate groups present in the prepolymer.

4. A method as claimed in claim 1 wherein the reaction of the prepolymer with the oligoamide is conducted at a temperature of 0° C. to 120° C.

5. A method as claimed in claim 1 wherein the solvent is selected from the group consisting of N,N-dimethylformamide, N,N-dimethylacetamide, dimethylsulfoxide and hexamethylenesulfonamide which can dissolve the resulting block copolymer.

6. A method as claimed in claim 1 wherein the reaction of the prepolymer with the oligoamide is conducted in the presence of a catalyst.

7. A method as claimed in claim 6 wherein the catalyst is selected from the group consisting of stannous chloride, stannic chloride, di-n-butyl tin dilaurate, ferrous acetyl acetonate and lead oleate.

8. A block copolymer as prepared by the method of claim 1.

9. A block copolymer prepared by reacting a difunctional compound having active hydrogen atoms and an average molecular weight of 500–20,000 with an excess of an organic diisocyanate compound to prepare a prepolymer having terminal isocyanate groups, and reacting the formed prepolymer with an aromatic oligoamide having an average molecular weight of 300–5000 and a melting point not lower than 100° C., said oligoamide being selected from the group consisting of the compounds of the formulae:

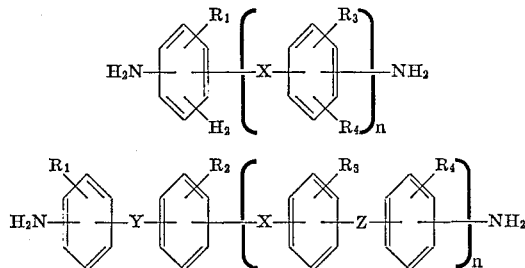

wherein each of $R_1$, $R_2$, $R_3$ and $R_4$ is a member selected from the group consisting of hydrogen, halogen atoms and alkyl groups have 1–4 carbon atoms, X is —NRCO— or —CONR— wherein R is a member selected from the group consisting of hydrogen, halogen atoms, alkyl groups having 1–4 carbon atoms, each of Y and Z is a single bond connecting the adjacent phenylene groups or a divalent group selected from the class consisting of —O—, —SO$_2$—, —CO— and

wherein each of R' and R" is a member selected from the class consisting of hydrogen, halogen atoms or alkyl groups having 1–4 carbon atoms, and $n$ is a number of at least one.

10. A block copolymer according to claim 9 wherein the oligoamide is selected from the group consisting of the compounds of the following formulae:

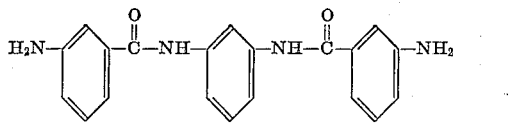

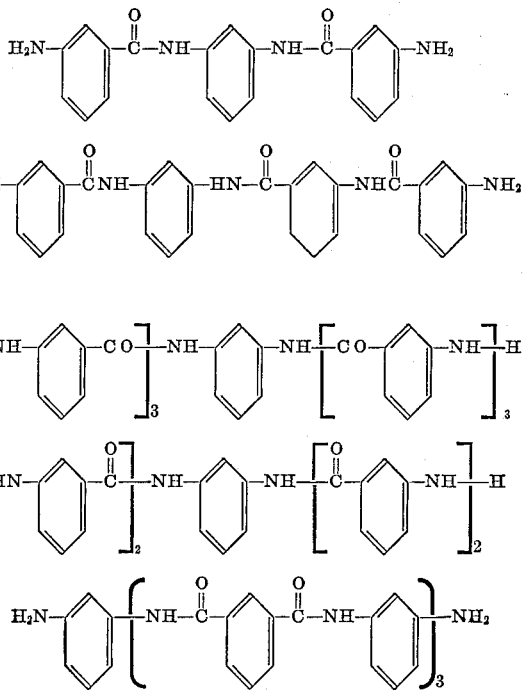

and

11. A block copolymer according to claim 9 wherein the amide is used in an amount of 85–110% of the theoretical amount in respect to the free isocyanate groups present in the prepolymer.

12. A block copolymer according to claim 9 wherein the reaction of the prepolymer with the oligoamide is conducted at a temperature of 0° C. to 120° C.

References Cited

UNITED STATES PATENTS

| | | | |
|---|---|---|---|
| 3,245,961 | 4/1966 | Fetscher et al. | 260—77.5 |
| 3,375,299 | 3/1968 | Levine et al. | 260—830 |
| 3,405,162 | 10/1968 | Kuryla | 260—465.6 |
| 3,428,710 | 2/1969 | Daumiller et al. | 260—857 |

DONALD E. CZAJA, Primary Examiner

H. S. COCKERAM, Assistant Examiner

U.S. Cl. X.R.

161—190; 260—30.4, 30.8, 32.6, 75 NH, 77.5 AM, 77.5 SP, 78 A, 78 R, 859

UNITED STATES PATENT OFFICE
CERTIFICATE OF CORRECTION

Patent No. 3,632,536    Dated January 4, 1972

Inventor(s) Yoshio IWAKURA, Keikichi UNO, Shigeru KAJIYAMA, Yoshihiro KITUDA, Takao KUSUSHITA and Kunio IIJIMA.

It is certified that error appears in the above-identified patent and that said Letters Patent are hereby corrected as shown below:

Column 3, line 37, change "NR" to -- R --.
Column 6, line 6, change "Stain" to -- Strain --.
Column 10, line 10, change "NR" to -- R --.
Column 9, lines 40 - 45 and Column 11, lines 38 - 44, change the formula to:

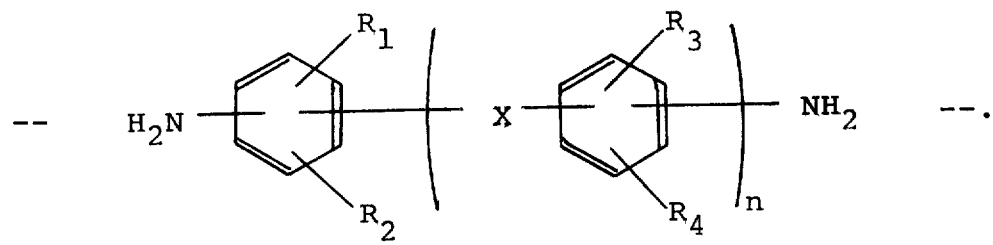

Signed and sealed this 19th day of September 1972.

(SEAL)
Attest:

EDWARD M. FLETCHER, JR.
Attesting Officer

ROBERT GOTTSCHALK
Commissioner of Patents